(12) United States Patent
Mishra et al.

(10) Patent No.: US 11,329,950 B2
(45) Date of Patent: May 10, 2022

(54) WIDE AREA NETWORK EDGE DEVICE CONNECTIVITY FOR HIGH AVAILABILITY AND EXTENSIBILITY

(71) Applicant: Cisco Technology, Inc., San Jose, CA (US)

(72) Inventors: Ajay Kumar Mishra, Livermore, CA (US); Satyajit Das, Livermore, CA (US); Laxmikantha Reddy Ponnuru, Santa Clara, CA (US); Anubhav Gupta, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 124 days.

(21) Appl. No.: 16/530,596

(22) Filed: Aug. 2, 2019

(65) Prior Publication Data
US 2021/0036987 A1    Feb. 4, 2021

(51) Int. Cl.
| | | |
|---|---|---|
| *H04W 56/00* | (2009.01) | |
| *H04L 61/2592* | (2022.01) | |
| *H04L 61/5007* | (2022.01) | |
| *H04L 41/08* | (2022.01) | |
| *H04L 41/0668* | (2022.01) | |
| *H04L 45/00* | (2022.01) | |
| *H04L 12/46* | (2006.01) | |
| *H04L 67/12* | (2022.01) | |

(52) U.S. Cl.
CPC ...... *H04L 61/2592* (2013.01); *H04L 12/4633* (2013.01); *H04L 41/0668* (2013.01); *H04L 41/08* (2013.01); *H04L 45/22* (2013.01); *H04L 61/2007* (2013.01); *H04L 67/12* (2013.01)

(58) Field of Classification Search
CPC ............ H04L 61/2592; H04L 12/4633; H04L 41/0668; H04L 41/08; H04L 45/22; H04L 61/2007; H04L 67/12
USPC ........................................................ 370/225
See application file for complete search history.

(56) References Cited

U.S. PATENT DOCUMENTS

| | | | | |
|---|---|---|---|---|
| 2002/0109879 A1* | 8/2002 | Wing So | ............. | H04J 14/0241 398/58 |
| 2003/0142669 A1* | 7/2003 | Kubota | ................. | H04L 45/502 370/389 |
| 2006/0090008 A1* | 4/2006 | Guichard | ............ | H04L 12/4633 709/246 |
| 2009/0003223 A1* | 1/2009 | McCallum | .............. | H04L 45/28 370/244 |
| 2013/0276090 A1* | 10/2013 | Kopti | .................... | H04W 88/16 726/11 |

(Continued)

*Primary Examiner* — Sai Ming Chan
(74) *Attorney, Agent, or Firm* — Polsinelli PC

(57) ABSTRACT

A WAN controller can configure a first WAN interface on a first WAN edge device to connect to a first transport network. The WAN controller can configure a second WAN interface on a second WAN edge device to connect to a second transport network. The WAN controller or the first WAN edge device, connected to a first access device of an access network, can determine the first WAN edge device has no Layer 2 connectivity to the second WAN edge device, connected to a second access device of the access network. The WAN controller or the first WAN edge device can establish a tunnel between the first WAN edge device and the second WAN interface. The WAN controller can route a specified class of WAN traffic received by the first WAN edge device from the access network through the tunnel.

20 Claims, 9 Drawing Sheets

(56) References Cited

U.S. PATENT DOCUMENTS

2015/0381384 A1* 12/2015 Visser ................. H04L 63/0435
370/254
2018/0331953 A1* 11/2018 Hoang .................... H04L 45/66

* cited by examiner

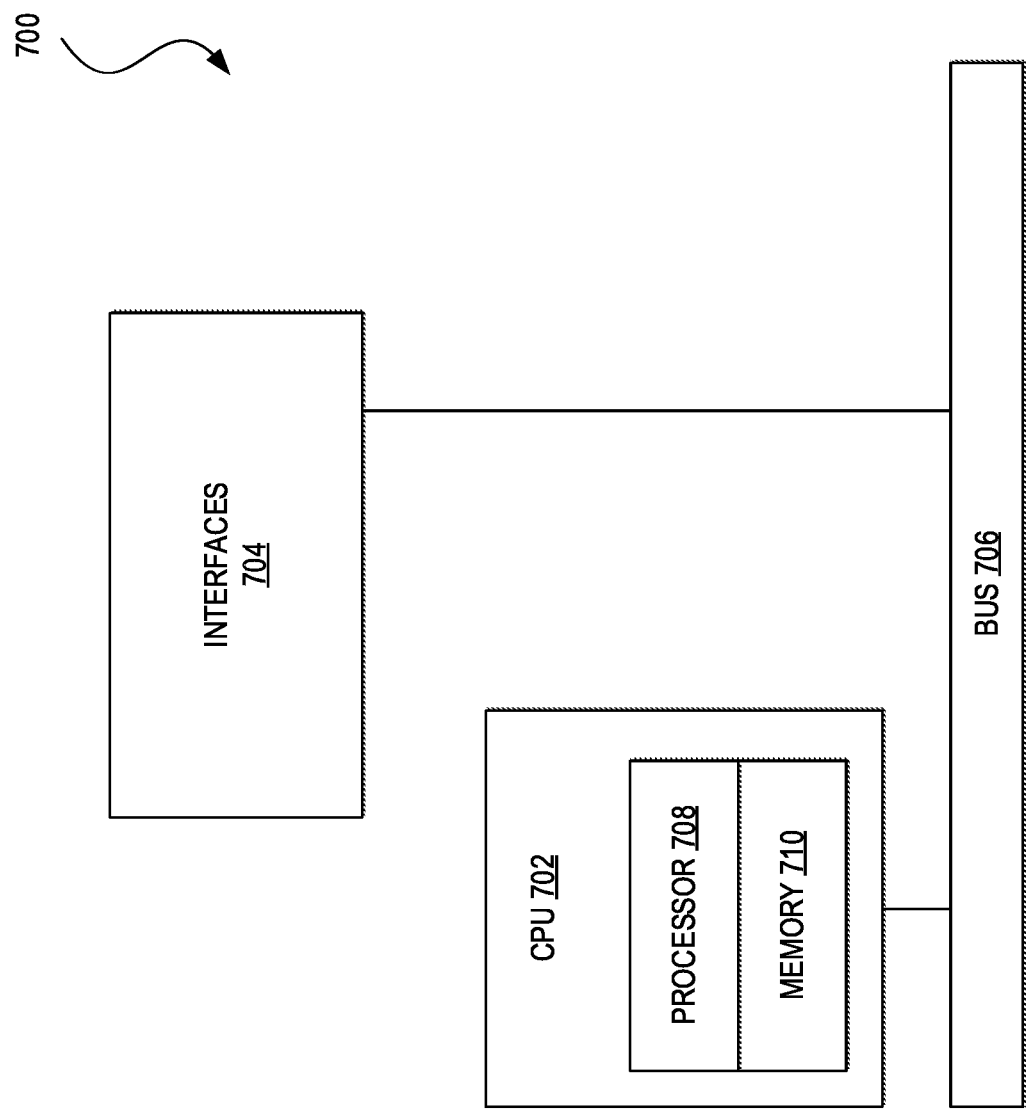

WIDE AREA NETWORK EDGE DEVICE CONNECTIVITY FOR HIGH AVAILABILITY AND EXTENSIBILITY

TECHNICAL FIELD

The subject matter of this disclosure relates in general to the field of computer networking, and more particularly, to systems and methods for connecting Wide Area Network (WAN) edge devices for high availability and extensibility.

BACKGROUND

The enterprise network landscape is continuously evolving. There is a greater demand for mobile and Internet of Things (IoT) device traffic, Software as a Service (SaaS) applications, and cloud adoption. In addition, security needs are increasing and certain applications can require prioritization and optimization for proper operation. As this complexity grows, there is a push to reduce costs and operating expenses while providing for high availability and scale.

Conventional WAN architectures are facing major challenges under this evolving landscape. Conventional WAN architectures typically consist of multiple Multi-Protocol Label Switching (MPLS) transports, or MPLS paired with Internet or Long-Term Evolution (LTE) links used in an active/backup fashion, most often with Internet or SaaS traffic being backhauled to a central data center or regional hub for Internet access. Issues with these architectures can include insufficient bandwidth, high bandwidth costs, application downtime, poor SaaS performance, complex operations, complex workflows for cloud connectivity, long deployment times and policy changes, limited application visibility, and difficulty in securing the network.

In recent years, Software-Defined Wide-Area Network (SD-WAN) solutions have been developed to address these challenges. SD-WAN is part of a broader technology of software-defined networking (SDN). SDN is a centralized approach to network management which can abstract away the underlying network infrastructure from its applications. This de-coupling of data plane forwarding and control plane can allow a network operator to centralize the intelligence of the network and provide for more network automation, operations simplification, and centralized provisioning, monitoring, and troubleshooting. SD-WAN can apply these principles of SDN to the WAN.

BRIEF DESCRIPTION OF THE FIGURES

To provide a more complete understanding of the present disclosure and features and advantages thereof, reference is made to the following description, taken in conjunction with the accompanying drawings, in which:

FIG. 7 illustrates a block diagram of an example of a network device in accordance with an embodiment.

DESCRIPTION OF EXAMPLE EMBODIMENTS

Figure 1:
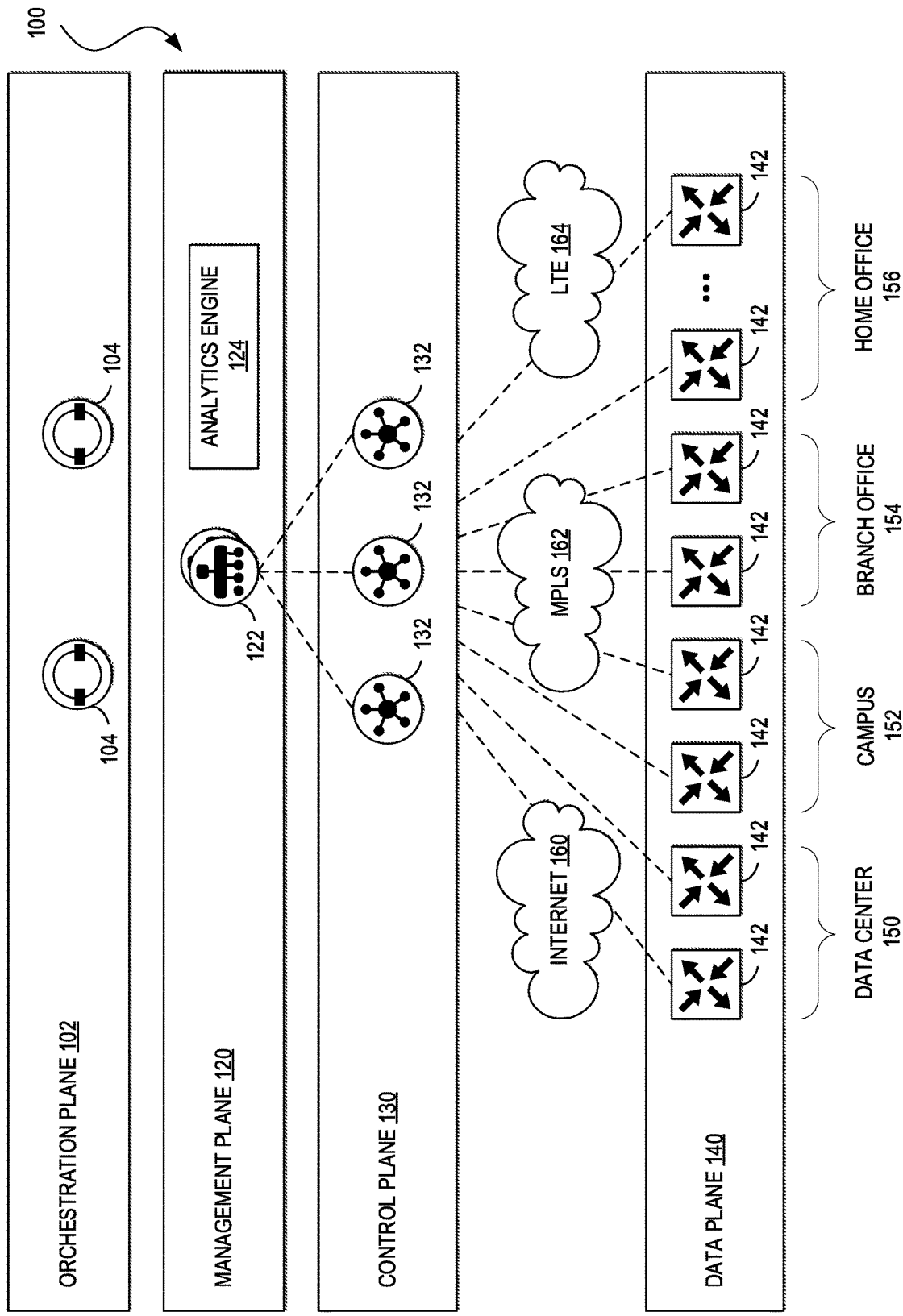
FIG. 1 illustrates a block diagram of an example of a network in accordance with an embodiment.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods provide for connecting Wide Area Network (WAN) edge devices for high availability and extensibility. A WAN controller can configure a first WAN interface on the first WAN edge device to connect to a first transport network. The WAN controller can configure a second WAN interface on a second WAN edge device to connect to a second transport network. The WAN controller or the first WAN edge device, when connected to a first access device of an access network, can determine the first WAN edge device has no Layer 2 connectivity to a second WAN edge device, connected to a second access device of the access network. The WAN controller or the first WAN edge device can establish a tunnel between the first WAN edge device and the second WAN interface. The WAN controller can route a specified class of WAN traffic received by the first WAN edge device from the access network through the tunnel.

Example Embodiments

Some WAN deployments can provide high availability by implementing active-active redundancy for a pair of WAN edge devices. In addition to network resiliency and network device resiliency, this approach can provide a cost-effective solution for network operators to extend WAN connectivity to both edge devices and the nodes (e.g., physical or virtual hosts, network devices, network appliances, network services, etc.) to which they are connected. However, current implementations require the WAN edge devices to be in the same broadcast domain (i.e., having connectivity over Layer 2 (L2) of the Open Systems Interconnection (OSI) model), such as by directly connecting the devices or connecting the device to a common L2 network (e.g., directly connecting the WAN edge devices to a common L2 device, configuring Layer 3 (L3) interfaces on the WAN edge devices to be in the same subnet, etc.). This is because local routing (e.g., Border Gateway Protocol (BGP), Open Shortest Path First (OSPF), etc.) cannot guarantee traffic routed reachability from one WAN edge device to a WAN interface on another WAN edge device. It may not be possible to provide L2 connectivity between a pair of WAN edge devices when they are located physically far apart from one another or when the WAN edge devices are a part of a large network deployment. As a result, hosts having L2 connectivity to one WAN edge device may not be able to connect to the other WAN edge device not having L2 connectivity to the one WAN edge device, and the benefits of WAN high availability and extensibility may not be achievable. Various embodiments of the present disclosure can overcome these and other deficiencies of the prior art.

In some embodiments, a computer-implemented method is provided for determining that a first WAN edge device connected to a first WAN access device of an access network has no Layer 2 connectivity to a second WAN edge device connected to a second access device of the access network; configuring a first WAN interface on the first WAN edge device to connect to a first transport network; configuring a second WAN interface on a second WAN edge device to connect to a second transport network; establishing a tunnel between the first WAN edge device and the second WAN interface; and routing a specified class of WAN traffic received by the first WAN edge device from the access network through the tunnel.

In some embodiments, the computer-implemented method can further comprise establishing a second tunnel between the second WAN device and the first WAN interface; and routing a second specified class of WAN traffic received by the second WAN edge device from the access network through the second tunnel. The computer-implemented method can further comprise determining there is no connectivity to the second transport network; and routing WAN traffic received by the second WAN edge device from the access network through the second tunnel.

In some embodiments, the computer-implemented method can further comprise determining there is no connectivity to the first transport network; and routing WAN traffic received by the first WAN edge device from the access network through the tunnel.

In some embodiments, the computer-implemented method can further comprise configuring an extended MPLS interface on the first WAN edge device, wherein the tunnel is established between the extended MPLS interface and the second WAN interface on the second WAN edge device; advertising a subnet of the extended MPLS interface to the first transport network; and routing return WAN traffic received by the second WAN edge device from the first transport network to the subnet. In some embodiments, the subnet can be advertised by running a routing protocol in a transport Virtual Private Network (VPN) of the second WAN edge device.

In some embodiments, the computer-implemented method can further comprise configuring an extended Internet interface on the first WAN edge device with a private Internet Protocol (IP) address subnet such that the tunnel can be established between the extended Internet interface and the second WAN interface on the second WAN edge device; configuring the second WAN interface to translate a network address of return WAN traffic to the private IP address subnet; and routing the return WAN traffic to the private IP address subnet.

In some embodiments, the tunnel can be established using Generic Routing Encapsulation (GRE).

In some embodiments, the computer-implemented method can further comprise determining a failure by the first WAN; configuring an interface of the first access device connected to the first WAN edge device as a tunnel endpoint; establishing a second tunnel between the interface and the second WAN edge device; and routing traffic received by the first access device to the first WAN edge device through the second tunnel. The computer-implemented method can further comprise establishing a third tunnel between the second WAN edge device and the interface of the first access device; and routing return traffic received by the second WAN edge device to the first device through the third tunnel. In some embodiments, the second tunnel ends and the third tunnel begins at a service interface of a service VPN of the second WAN edge device. In other embodiments, the second tunnel ends and the third tunnel begins at the second WAN interface of the second WAN edge device.

In some embodiments, a system is provided comprising one or more processors; and memory including instructions that, when executed by the one or more processors, cause the system to configure a first WAN interface on a first WAN edge device to connect to a first transport network; configure a second WAN interface on a second WAN edge device to connect to a second transport network; determine that the first WAN edge device, connected to a first access device of an access network, has no L2 connectivity to a second WAN edge device, connected to a second access device of the access network; establish a tunnel between the first WAN edge device and the second WAN interface; and route a specified class of WAN traffic received by the first WAN edge device from the access network through the tunnel.

In some embodiments, a non-transitory computer-readable storage medium is provided including instructions that, when executed by one or more processors of a system, cause the system to configure a first WAN interface on a first WAN edge device to connect to a first transport network; configure a second WAN interface on a second WAN edge device to connect to a second transport network; determine that the first WAN edge device, connected to a first access device of an access network, has no Layer 2 connectivity to a second WAN edge device connected to a second access device of the access network; establish a tunnel between the first WAN edge device and the second WAN interface; and route a specified class of WAN traffic received by the first WAN edge device from the access network through the tunnel. Numerous other functions and advantages are described and suggested below as may be provided in accordance with the various embodiments.

FIG. 1 illustrates an example of a network 100 for implementing aspects of the present technology. An example of an implementation of the network 100 is the Cisco® Software Defined Wide Area Network (SD-WAN) architecture. However, one of ordinary skill in the art will understand that, for the network 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network 100 can comprise an orchestration plane 102, a management plane 120, a control plane 130, and a data plane 140. The orchestration plane 102 can assist in the automatic on-boarding of WAN edge devices 142 (e.g., switches, routers, etc.) in an overlay network. The orchestration plane 102 can include one or more physical or virtual network orchestrator appliances 104. The network orchestrator appliances 104 can perform the initial authentication of the WAN edge devices 142 and orchestrate connectivity between devices of the control plane 130 and the data plane 140. In some embodiments, the network orchestrator appliances 104 can also enable communication of devices located behind Network Address Translation (NAT). In some embodiments, physical or virtual Cisco® SD-WAN vBond appliances can operate as the network orchestrator appliances 104.

The management plane 120 can be responsible for central configuration and monitoring of a network. The management plane 120 can include one or more physical or virtual network management appliances 122. The network management appliances 122 can provide centralized management of the network via a graphical user interface to enable a user to monitor, configure, and maintain the WAN edge devices 142 and links to transport networks (e.g., Internet transport network 160, MPLS network 162, LTE network 164, etc.) in an underlay and overlay network. The network management appliances 122 can support multi-tenancy and enable centralized management of logically isolated networks associated with different entities (e.g., enterprises, divisions within enterprises, groups within divisions, etc.). Alternatively or in addition, the network management appliances 122 can be a dedicated network management system for a single entity. In some embodiments, physical or virtual Cisco® SD-WAN vManage appliances can operate as the network management appliances 122.

The management plane 120 can also include an analytics engine 124 for providing visibility into the performance of applications and the network over time, such as the best and worst performing applications, the most bandwidth consuming applications, anomalous applications families (e.g., applications whose bandwidth consumption change over a period of time), network availability and circuit availability, carrier health, best and worst performing tunnels, and so forth. The analytics engine 124 may include a user interface that can generate graphical representations of an overlay network and enable users to drill down to display the characteristics of a single carrier, tunnel, or application at a particular time. The user interface can serve as an interactive overview of the network and an entrance point for more details. In some embodiments, the user interface can display information for the last 24 hours and enable a user to drill down to select different time periods for different data sets to display. The user interface can also display data for network availability, WAN performance by carrier, and applications, among other network analytics.

In some embodiments, the analytics engine 124 can provide application performance with a Virtual Quality of Experience (vQoE) value, which can be customized for individual applications. This value can range from zero to ten, with zero being the worst performance and ten being the best. The analytics engine can calculate vQoE based on latency, loss, and jitter, and customize the calculation for each application.

The analytics engine 124 can offer insight into planning the WAN and into its operational aspects, from historical performance, to forecasting, to providing recommendations for optimizing the WAN. The analytics engine 124 can store months of data, apply machine learning algorithms, and provide unique insights and recommendations. For example, the analytics engine 124 can offer forecasting recommendations to plan for sites that may need additional bandwidth in the next three to six months; what-if scenarios to help identify opportunities for balancing cost, performance, and availability of networks and applications; application-aware routing policies based on historical information to fine tune the WAN; recommended network service providers for a specific location; and so forth.

The control plane 130 can build and maintain a network topology and make decisions on where traffic flows. The control plane 130 can include one or more physical or virtual network controller appliances 132. The network controller appliances 132 can establish secure connections to each WAN edge device 142 and distribute route and policy information via a control plane protocol (e.g., Overlay Management Protocol (OMP) (discussed in further detail below), Open Shortest Path First (OSPF), Intermediate System to Intermediate System (IS-IS), BGP, Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliances 132 can operate as route reflectors. The network controller appliances 132 can also orchestrate secure connectivity in the data plane 140 between and among the WAN edge devices 142. For example, in some embodiments, the network controller appliances 132 can distribute crypto key information among the WAN edge devices 142. This can allow the network to support a secure network protocol or application (e.g., IPSec, Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliances 132.

The data plane 140 can be responsible for forwarding packets based on decisions from the control plane 130. The data plane 140 can include the WAN edge devices 142, which can be physical or virtual network devices. The WAN edge devices 142 can operate within various sites associated with an organization, such as in one or more data centers 150, campus networks 152, branch offices 154, home offices 156, and so forth, or in the cloud (e.g., Infrastructure as a Service (IaaS), Platform as a Service (PaaS), SaaS, and other cloud service provider networks). The WAN edge devices 142 can provide secure data plane connectivity among the Local Area Networks (LANs) or the cloud over one or more WAN transport networks, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), LTE networks 164 or other mobile networks (e.g., 3G, 4G, 5G, etc.), or other WAN technologies (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The WAN edge devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the WAN edge devices 142.

Figure 2:
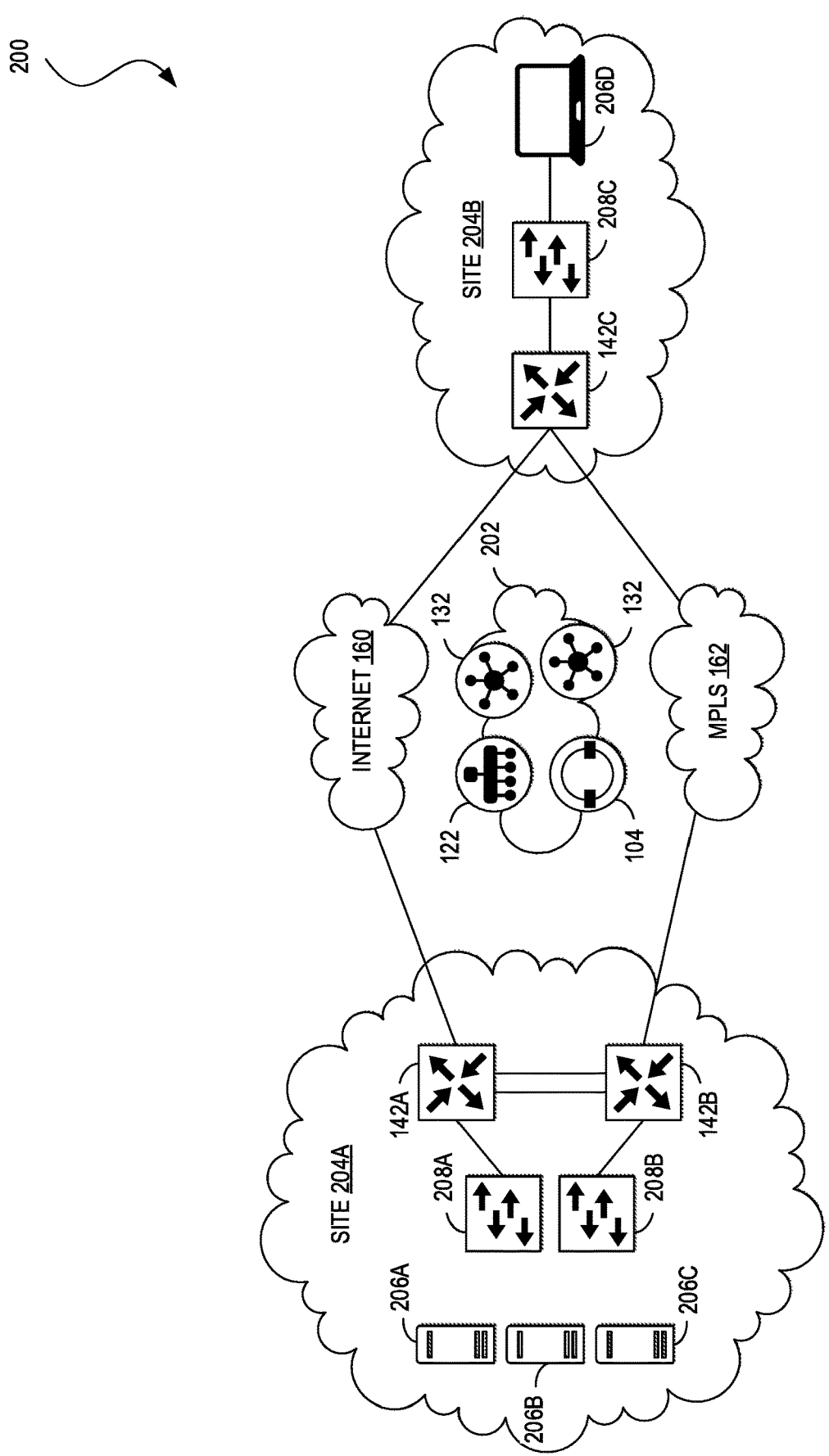
FIG. 2 illustrates a block diagram of an example of network for showing how to interconnect sites across a Wide Area Network (WAN) in accordance with an embodiment.

FIG. 2 illustrates an example of a network 200 for showing various aspects of the network 100. The network 200 can include a management network 202, a pair of sites 204A and 204B (collectively, 204) (e.g., the data centers 150, the campus networks 152, the branch offices 154, the home offices 156, cloud service provider networks, etc.), and a pair of transport networks (e.g., the Internet transport network 160 and MPLS network 162). The management network 202 can include one or more network orchestrator appliances 104, one or more network management appliances 122, and one or more network controller appliances 132. Although the management network 202 is shown as a single network in this example, one of ordinary skill in the art will understand that each component of the management network 202 can be distributed across any number of networks and/or be co-located with the sites 204. In this example, each component of the management network 202 can be reached through either transport network 160 or 162.

Each site 204 can include one or more hosts 206A-206D (collectively, 206) (sometimes also referred to as endpoints, computing devices, computing systems, etc.) connected to one or more access devices 208A-208C (collectively, 208), which are in turn connected to one or more WAN edge devices 142A-C) (collectively, 142). The hosts 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The hosts 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, Heating, Ventilation, and Air Conditioning (HVAC) equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identifier (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The access devices 208 can include physical or virtual switches, routers, and other network devices. Although the site 204A is shown including a pair of access devices 208A and 208B and a pair of WAN edge devices 142A and 142B, and the site 204B is shown including a single access device 208 and a single WAN edge device 142 in this example, the sites 204 can comprise any number of network devices in any network topology, including multi-tier (e.g., core, distribution or aggregation, and access tiers), spine-and-leaf, mesh, tree, bus, hub and spoke, and so forth. For example, in some embodiments, one or more data centers may implement the Cisco® Application Centric Infrastructure (Cisco ACI™) architecture and/or one or more campus networks may implement the Cisco® Software Defined Access (SD-Access or SDA) architecture. In this example, the access devices 208 can operate as WAN aggregation devices to directly connect (e.g., via a single hop) or indirectly connect (e.g., via multiple hops) nodes of the sites 204, such as the hosts 206 and other network devices (not shown), to the WAN edge devices 142, and the WAN edge devices 142 can connect the access devices 208 to the transport networks 160 or 162.

In some embodiments, "color" can be used to identify or distinguish an individual WAN transport network (e.g., no same color may be used twice on a single WAN edge device 142), and different WAN transport networks may be assigned different colors (e.g., mpls, private1, biz-internet, metro-ethernet, lte, etc.). In this example, the network 200 can utilize a color called "biz-internet" for the Internet transport network 160 and a color called "public-internet" for the MPLS network 162. In other embodiments, colors by themselves can also have significance. For example, the colors metro-ethernet, mpls, and private1, private2, private3, private4, private5, and private6 may be considered private colors, which can be used for private networks or in places where there is no NAT addressing of the transport IP hosts (e.g., because there may be no NAT between two hosts of the same color). When the WAN edge devices 142 use a private color, they may attempt to build IPSec tunnels to other edge devices using native, private, underlay IP addresses. The public colors can include 3g, biz, internet, blue, bronze, custom1, custom2, custom3, default, gold, green, lte, public-internet, red, and silver. The public colors may be used by the WAN edge devices 142 to build tunnels to post-NAT IP addresses (if there is NAT involved). If the WAN edge devices 142 use private colors and need NAT to communicate to other private colors, the carrier setting in the configuration can dictate whether the WAN edge devices 142 use private or public IP addresses. Using this setting, two private colors can establish a session when one or both are using NAT.

Figure 3:
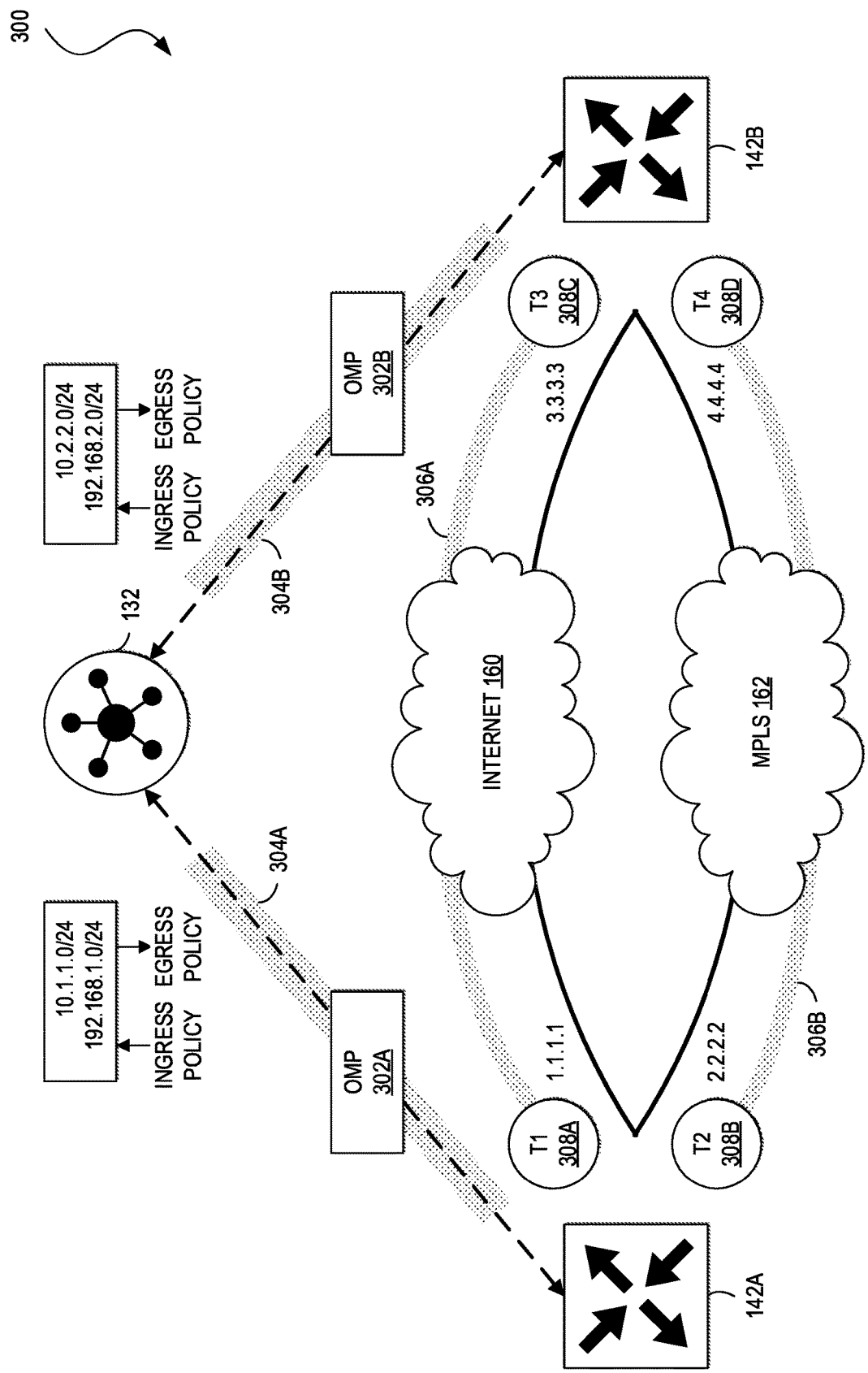
FIG. 3 illustrates a block diagram of an example of an approach for managing an overlay network in accordance with an embodiment.

FIG. 3 illustrates a block diagram 300 of an example approach for managing an overlay network, such as via OMP. In this example, OMP messages 302A and 302B (collectively, 302) may be transmitted back and forth between the network controller appliance 132 and the WAN edge devices 142A and 142B, respectively, where control plane information, such as route prefixes, next-hop routes, crypto keys, policy information, and so forth, can be exchanged over respective secure Datagram Transport Layer Security (DTLS) or Transport Layer Security (TLS) connections 304A and 304B. The network controller appliance 132 can operate similarly to a route reflector. For example, the network controller appliance 132 can receive routes from the WAN edge devices 142, process and apply policies to them, and advertise routes to other WAN edge devices 142 in the overlay network. If there is no policy defined, the WAN edge devices 142 may behave in a manner similar to a full mesh topology, where each WAN edge device 142 can connect directly to another WAN edge device 142 at another WAN site and receive full routing information from each site.

OMP can advertise three types of routes:
- OMP routes, which can correspond to prefixes that are learned from the local WAN site (e.g., local relative to the WAN edge device 142), or service side, of the WAN edge device 142. The prefixes can be originated as static or connected routes, or from within a routing protocol (e.g., BGP, OSPF, etc.), and redistributed into OMP so they can be carried across the overlay. OMP routes can advertise attributes such as TLOC information (which can similar to a BGP next-hop IP address) and other attributes such as origin, originator, preference, site identifier, tag, and VPN identifier. An OMP route may be installed in the forwarding table if the TLOC to which it points is active.
- TLOC routes, which can correspond to logical tunnel endpoint on the WAN edge devices 142 that connect into the transport networks 160 or 162. In some embodiments, a TLOC route can be uniquely identified and represented by a three-tuple, including an IP address, link color, and encapsulation (e.g., GRE, IPSec, etc.). In addition to system IP address, color, and encapsulation, TLOC routes can also carry attributes such as TLOC private and public IP addresses, carrier, preference, site identifier, tag, and weight. In some embodiments, a TLOC may be in an active state on a particular WAN edge device 142 when an active BFD session is associated with that TLOC.

Service routes, which can represent services (e.g., firewall, distributed denial of service (DDoS) mitigator, load balancer, Intrusion Prevent System (IPS), Intrusion Detection Systems (IDS), WAN optimizer, etc.) that may be connected to the local WAN sites of the WAN edge devices 142 and accessible to other WAN sites for use with service insertion. In addition, these routes can also include VPNs; the VPN labels can be sent in an update type to tell the network controller appliance 132 what VPNs are serviced at a remote WAN site.

In the example of FIG. 3, OMP is shown running over the DTLS/TLS tunnels 304 established between the WAN edge devices 142 and the network controller appliance 132. In addition, the block diagram 300 shows an IPSec tunnel 306A established between TLOC 308A and 308C over the Internet transport network 160 and an IPSec tunnel 306B established between TLOC 308B and TLOC 308D over the MPLS network 162. Once the IPSec tunnels 306A and 306B are established, BFD can be enabled across each of them.

In some embodiments, network-wide segmentation can be implemented by defining groupings of network objects (e.g., Virtual Local Area Networks (VLANs), Virtual Network Identifiers (VNIDs), Virtual Routing and Forwarding (VRF) instances, VPNs, Endpoint Groups (EPGs), etc.) at the edges of the network (e.g., the WAN edge devices 142), and carrying segmentation information in the packets for intermediate nodes to handle. For example, the WAN edge device 142A can subscribe to two VPNs, a "red" VPN corresponding to the prefix 10.1.1.0/24 (e.g., either directly through a connected interface or learned via Internal Gateway Protocol (IGP) or BGP), and a "blue" VPN corresponding to the prefix 10.2.2.0/24. The WAN edge device 142B can likewise subscribe to two VPNs, the red VPN, corresponding to the prefix 192.168.1.0/24, and the blue VPN, corresponding to the prefix 192.168.2.0/24 (either directly through a connected interface or learned via IGP or BGP).

Because the WAN edge devices 142 have OMP connections over the DTLS/TLS tunnels 304 to the network controller appliance 132, they can propagate their routing information to the network controller appliance 132. On the network controller appliance 132, a network administrator can enforce policies to drop routes, to change TLOCs (which can be overlay next hops) for traffic engineering or service chaining, or to change the VPN identifier. The network administrator can apply these policies as inbound or outbound policies on the network controller appliance 132.

Prefixes belonging to a single VPN can be kept in a separate route table. This can provide L3 isolation for the various segments in the network. Thus, the WAN edge devices 142 can each have two VPN route tables. In addition, the network controller appliance 132 can maintain the VPN context of each prefix. Separate route tables can provide isolation on a single node. In some embodiments, VPN identifiers can be used to propagate routing information across the network. A VPN identifier carried in a packet can identify each VPN on a link. When a VPN is configured on a particular edge device, the VPN can have a link color or label associated with it. The edge device can send the link color or label, along with the VPN identifier, to the network controller appliance 132. The network controller appliance 132 can propagate information mapping the edge device to the VPN identifier to other edge devices in the network. Remote edge devices can then use the link color or label to send traffic to the appropriate VPN. Local edge devices, on receiving the data with the VPN identifier link color or label, can use the link color or label to demultiplex the data traffic. In this example, the transport networks that connect the WAN edge devices 142 can be unaware of the VPNs, the WAN edge devices 142 may know about VPNs, and the rest of the network can follow standard routing.

In some embodiments, policy can be used to influence the flow of traffic among the WAN edge devices 142. Policy can be characterized as centralized or local. Centralized policy can be provisioned on the network controller appliance 132, and localized policy can be provisioned on the WAN edge devices 142, which may sit at the network edge between WAN sites and a transport network, such as the Internet transport network 160, MPLS network 162, LTE network 164, and so forth.

Policy can also be characterized as control or routing policy, which may affect the flow of routing information in the network's control plane, or data policy, which may affect the flow of data traffic in the network's data plane. Centralized control policy can apply to the network-wide routing of traffic by affecting the information that is stored in the master route table of the network controller appliance 132 and that is advertised to the WAN edge devices 142. The effects of centralized control policy can be seen in how the WAN edge devices 142 direct traffic to its destination. The centralized control policy configuration itself can remain on the network controller appliance 132 and not be pushed to the WAN edge devices 142.

When no centralized control policy is provisioned, all OMP routes can be placed in the master route table of the network controller appliance 132, and the network controller appliance 132 can advertise all OMP routes to all of the WAN edge devices 142 in the same segment (e.g., subnet, VLAN, VNID, VRF, VPN, EPG, or other collection of hosts). By provisioning centralized control policy, an administrator or other user can affect which OMP routes are placed in the master route table of the network controller appliance 132, what route information is advertised to the WAN edge devices 142, and whether the OMP routes are modified before being put into the master route table or before being advertised.

When centralized control policy is provisioned, the network controller appliance 132 can redistribute route information to the WAN edge devices 142 or modify the route information that is stored in the master route table of the network controller appliance 132 or that is advertised by the network controller appliance 132. The network controller appliance 132 can activate the control policy by applying it to specific sites in the WAN in either the inbound or the outbound direction (with respect to the network controller appliance 132). Applying a centralized control policy in the inbound direction can filter or modify the routes being advertised by the WAN edge devices 142 before they are placed in the master route table on the network controller appliance 132. As the first step in the process, routes can be accepted or rejected. Accepted routes can be installed in the master route table on the network controller appliance 132 either as received or as modified by the control policy. Routes that are rejected by a control policy can be silently discarded.

Applying a control policy in the outbound direction can filter or modify the routes that the network controller appliance 132 redistributes to the WAN edge devices 142. As the first step of an outbound policy, routes can either be accepted or rejected. For accepted routes, centralized control policy can modify the routes before they are distributed by the network controller appliance 132. Routes that are rejected by an outbound policy are not advertised.

The WAN edge devices 142 can place route information learned from the network controller appliance 132 into their local route tables for use when forwarding data traffic. Because the network controller appliance 132 can operate as the centralized routing system in the network, the WAN edge devices 142 do not modify the OMP route information that they learn from the network controller appliance 132. The network controller appliance 132 can regularly receive OMP route advertisements from the WAN edge devices 142 and, after recalculating and updating the routing paths through the network, the network controller appliance 132 can advertise new routing information to the WAN edge devices 142.

The centralized control policy provisioned on the network controller appliance 132 can remain on the network controller appliance and not be downloaded to the WAN edge devices 142. However, the routing decisions that result from centralized control policy can be passed to the WAN edge devices 142 in the form of route advertisements, and so the effect of the control policy can be reflected in how the WAN edge devices 142 direct data traffic to its destination.

Localized control policy can be provisioned locally on the WAN edge devices 142. Localized control policy can be similar to the routing policies configured on a conventional router, such as how BGP and OSPF routing (or other routing protocol) behavior can be modified within a local WAN site. Localized data policy can allow for provisioning and application of access lists to a specific interface or interfaces on the WAN edge devices 142. Simple access lists can permit and restrict access based on a 6-tuple match (e.g., source and destination IP addresses and ports, Differentiated Services Code Point (DSCP) fields, and protocol), in the same way as with centralized data policy. Access lists can also allow provisioning of class of service (CoS), policing, and mirroring, which can control how data traffic flows out of and in to the interfaces and interface queues of the WAN edge devices 142.

Centralized data policy can apply to the flow of data traffic throughout the network. When no centralized data policy is provisioned, all prefixes within a particular network segment (e.g., subnet, VLAN, VNID, VRF, VPN, EPG, or other network segment technology) may be reachable from that segment. Provisioning centralized data policy can apply a 6-tuple filter that controls access between sources and destinations. As with centralized control policy, centralized data policy can be provisioned on the network controller appliance 132, and that configuration can remain on the network controller appliance 132. The effects of data policy can be reflected in how the WAN edge devices 142 direct data traffic to its destination. Unlike control policy, however, centralized data policies may be pushed to the WAN edge devices 142 in a read-only fashion.

In some embodiments, centralized data policies can be configured on the network controller appliance 132 using lists, policy definition (or policies), and policy application. Lists can define the targets of policy application or matching. Some examples of lists can include prefix lists (e.g., list of prefixes for use with policies), site lists (e.g., list of site identifiers for use in policy definitions and policy applications), TLOC lists (e.g., lists of TLOCs for use in policy definitions), and VPN lists (e.g., list of VPNs for use in policy) or lists of other network segments (e.g., VLANs, VNIDs, VRFs, EPGs, or other network segmentation technology). Policy definition (or policies) can control aspects of control and forwarding. Policy definition (or policies) can include different types of policies, such as control policies, data policies, and Zone-based Firewall (ZFW) policies (e.g., policies defining zones and controlling traffic between zones). Policy application can control what a policy is applied towards. Policy application can be site-oriented, and can be defined by the site-list.

Figure 4:
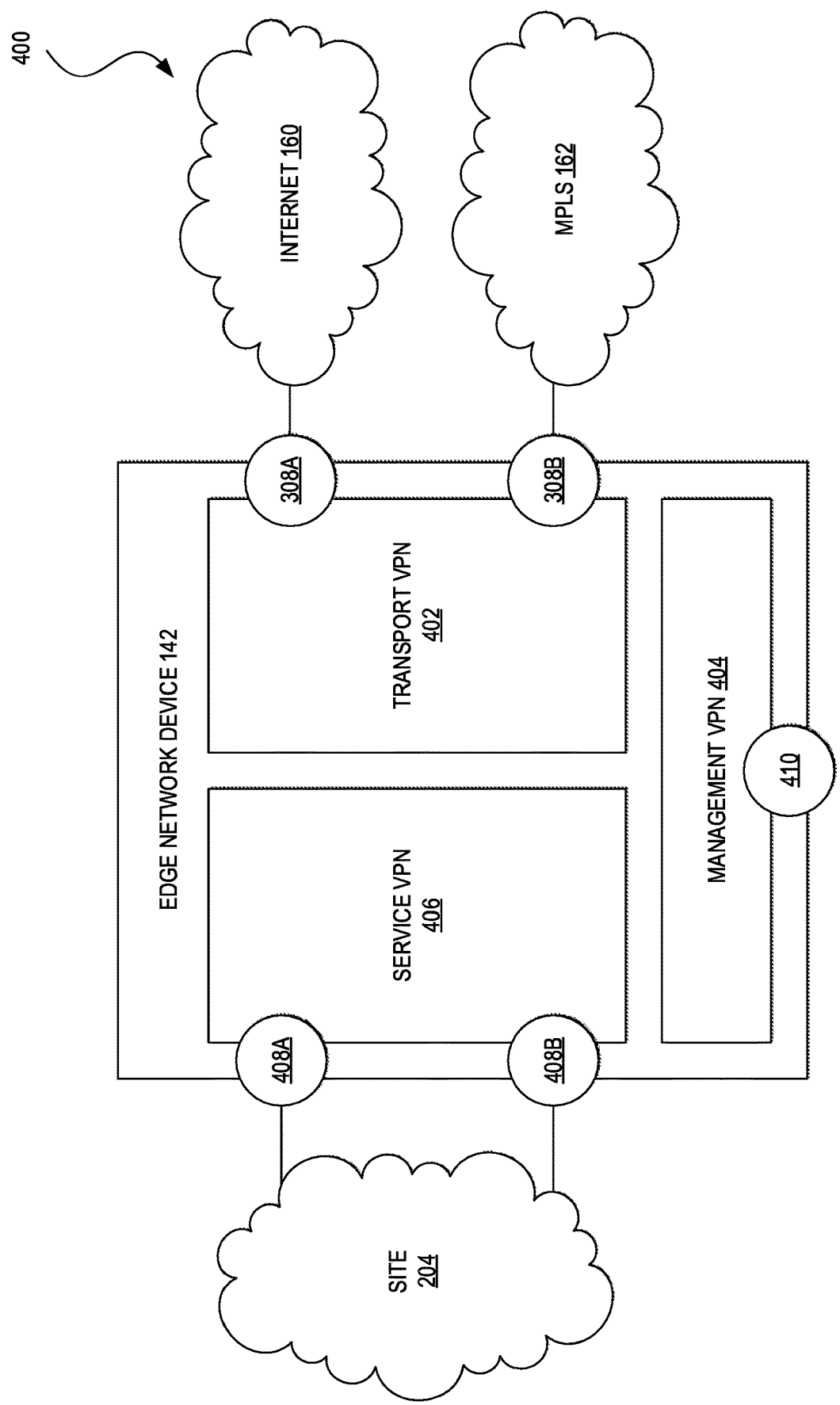
FIG. 4 illustrates a block diagram of an example of an approach for segmenting a network in accordance with an embodiment.

FIG. 4 illustrates a block diagram 400 of an example of an approach for segmenting a network using VPNs. VPNs can be isolated from one another and can have their own forwarding tables. An interface or sub-interface can be explicitly configured under a single VPN and may not be part of more than one VPN. Labels may be used in OMP route attributes and in the packet encapsulation, which can identify the VPN to which a packet belongs. The VPN number can be a four-byte integer with a value from 0 to 65530. In some embodiments, each WAN edge device 142 can include a transport VPN 402 (e.g., VPN number zero) and a management VPN 404 (e.g., VPN number five-hundred twelve). The transport VPN 402 can include one or more physical or virtual network interfaces (e.g., Gigabit Ethernet network interfaces corresponding to the TLOCs 308A and 308B) that respectively connect to transport networks (e.g., the Internet transport network 160 and the MPLS network 162). Secure DTLS/TLS connections to the network controller appliances 132 or between the network controller appliances 132 and the network orchestrator appliances 104 can be initiated from the transport VPN 402. In addition, static or default routes or a dynamic routing protocol can be configured inside the transport VPN 402 to get appropriate next-hop information so that the control plane 130 may be established and IPSec tunnels 306 (not shown) can connect to remote WAN sites.

The management VPN 404 can carry out-of-band management traffic to and from the network orchestrator appliances 104, network management appliances 122, network controller appliances 132, and/or WAN edge devices 142 over a management network interface 412. In some embodiments, the management VPN 404 may not be carried across the overlay network.

In addition to the transport VPN 402 and the management VPN 404, each WAN edge device 142 can also include one or more other service VPNs 406. The service VPN 406 can include one or more physical or virtual network interfaces (e.g., Gigabit Ethernet network interfaces 408A and 408B) that connect to one or more local WAN sites 414 (i.e., local relative to the WAN edge device 142) and carry data traffic. The service VPN 406 can be configured to provide features such as OSPF or BGP, Virtual Router Redundancy Protocol (VRRP), QoS, traffic shaping, policing, and so forth. In some embodiments, data traffic can be directed over IPSec tunnels to other WAN sites by redistributing OMP routes received from the network controller appliances 132 at the site 204 into the routing protocol configured for the service VPN 406. In turn, routes from the site 204 can be advertised to other sites by advertising the service VPN routes into the OMP routing protocol, which can be sent to the network controller appliances 132 and be redistributed to other WAN edge devices 142 in the network.

Figure 5A:
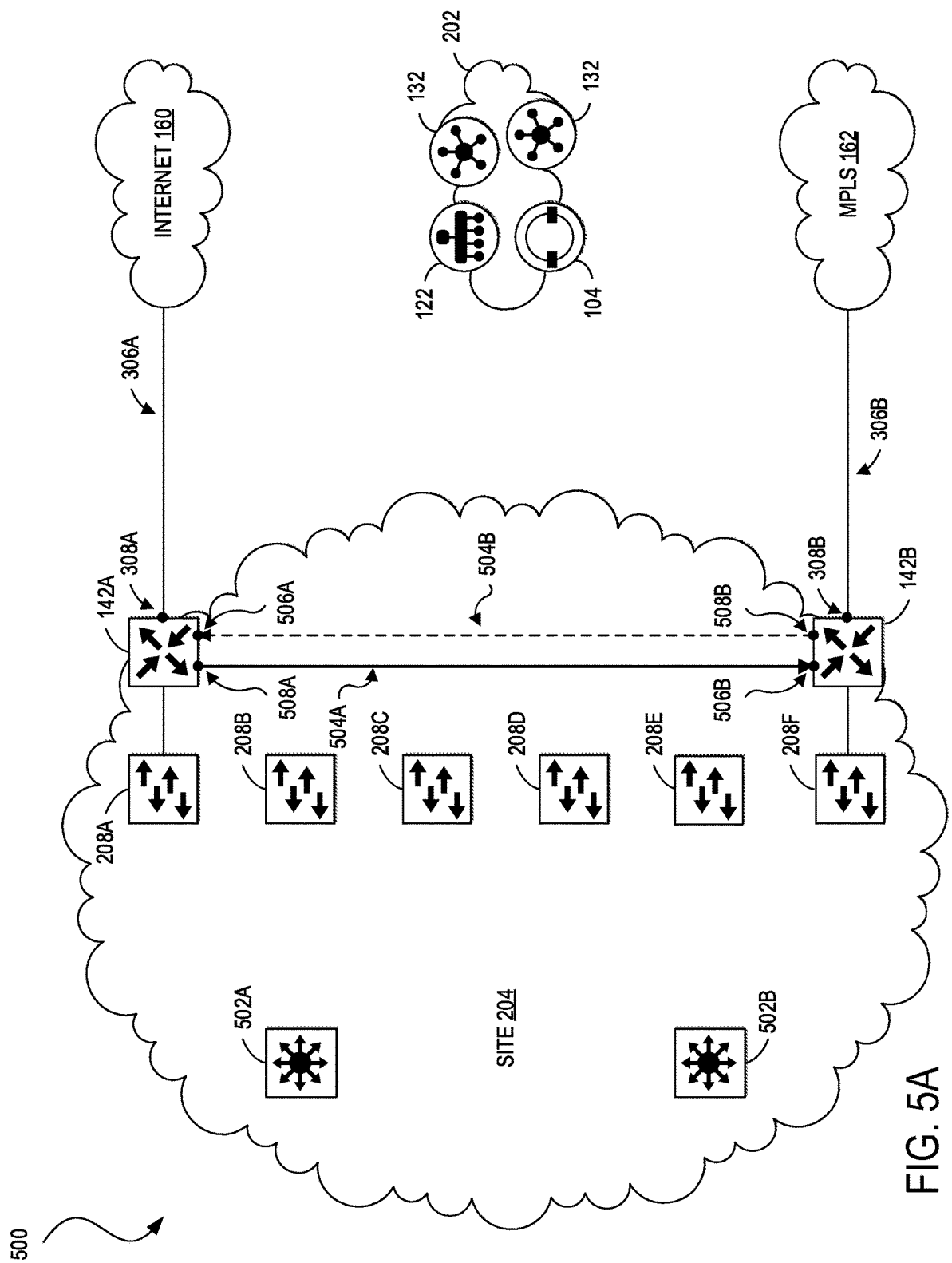
FIGS. 5A and 5B illustrate block diagrams of examples of networks for showing how to connect WAN edge devices to provide for high availability and extensibility in accordance with some embodiments.

FIG. 5A illustrates a block diagram of an example of a network 500 showing how to connect WAN edge devices to achieve WAN high availability and extensibility. The network 500 can include the management network 202, the site 204 (e.g., the data center 150, the campus network 152, the branch office 154, etc.), the Internet transport network 160, and the MPLS network 162. The management network 202 can include one or more network orchestrator appliances 104, one or more network management appliances 122, and one or more network controller appliances 132. Although the management network 202 is shown as a single network in this example, one of ordinary skill in the art will understand that each component of the management network 202 can be distributed across any number of networks and/or be co-located with the site 204. In this example, each component of the management network 202 can be reached through either transport network 160 or 162.

The site 204 can be an access network, a campus network, a LAN, an L2/L3 network, or other network in which nodes (e.g., hosts, network devices, subnets, networks, etc.) can connect directly (e.g., single hop) or indirectly (e.g., multiple hops) to one another without WAN connectivity. The site 204 can include multi-layer network devices 502A and 502B (collectively, 502), the access devices 208A-208F, and the WAN edge device 142A and 142B. The multi-layer network devices 502 can process traffic over various network layers (e.g., Layers 2-7) and protocols (e.g., BGP, OSPF, etc.) depending on the network topology of the site 204. For example, in some embodiments, the site 204 can implement a spine-and-leaf network topology, and the multi-layer network devices 502 may operate as spine switches and the access devices 208 may operate as leaf switches, with each spine switch directly connected to each access device 208. As another example, the site 204 can implement a multi-tier network topology and the multi-layer network devices 502 can operate as core layer network devices (with distribution or aggregation layer network devices not shown) or distribution or aggregation layer network devices (with core layer network devices not shown) and the access devices 208 can operate as access layer network devices. The multi-layer network devices 502 may or may not be directly connected to one another, and may or may not be directly connected or indirectly connected (e.g., via one or more intermediate network devices) to all of the access devices 208 but connect directly or indirectly to one or more of the access devices 208. In some embodiments, the site 204 can include a centralized network controller (not shown) (e.g., Cisco® SD-Access, Cisco ACI™, etc.) for controlling switching, routing, and other network functionality within the site 204. In other embodiments, the network devices may be separately configured and managed. Various other network topologies may also be used in other embodiments without departing from the scope of the present disclosure.

In this example, the WAN edge device 142A can include the WAN interface 308A that directly connects to the Internet transport network 160 over the IPSec tunnel 306A, and the WAN edge device 142B can include the WAN transport interface 308B to directly connect to the MPLS network 162 over the IPSec tunnel 306B. Direct links 504A and 504B (collectively, 504) between the WAN edge devices 142 can enable the devices to access each other's transport networks. That is, the link 504A can allow the WAN edge device 142A to access the MPLS network 162 through a TLOC-extension interface 506B on the WAN edge device 142B, and the link 504B can allow the WAN edge device 142B to access the Internet transport network 160 through a TLOC-extension interface 506A on the WAN edge device 142A. Each TLOC-extension interface 506 can be configured within a transport VPN (e.g., the transport VPN 402) of the WAN edge device 142 by specifying the WAN interface 308 to which the TLOC-extension interface is bound. In this example, the TLOC-extension interface 506A is bound to the WAN interface 308A on the WAN edge device 142A, and the TLOC-extension interface 506B is bound to the WAN interface 308B on the WAN edge device 142B.

In some embodiments, the WAN edge devices 142 can be configured to ensure reachability to the network controller appliances 132 and tunnel endpoints on the other side of the IPSec tunnels 306 over the TLOC extension interfaces 506. For example, to reach the MPLS network 162, an MPLS interface 508A can be configured on the WAN edge device 142A with a default route to the TLOC-extension interface 506B. To ensure traffic can be routed back to the TLOC extension interface 506B, a routing protocol (e.g., BGP, OSPF, etc.) can be run in the transport VPN of the WAN edge device 142B to advertise a subnet of the MPLS interface 508A so that, for example, an MPLS provider has a route to the subnet of the MPLS interface 508A through the WAN edge device 142B.

To reach the Internet transport network 160, an Internet interface 508B can be configured on the WAN edge device 142B with a default route to the TLOC-extension interface 506A. If the Internet interface 508B is in a private address space, then the WAN interface 308A can be configured to perform Network Address Translation to ensure traffic from the Internet transport network 160 can be routed back to the WAN edge device 142B.

Figure 5B:
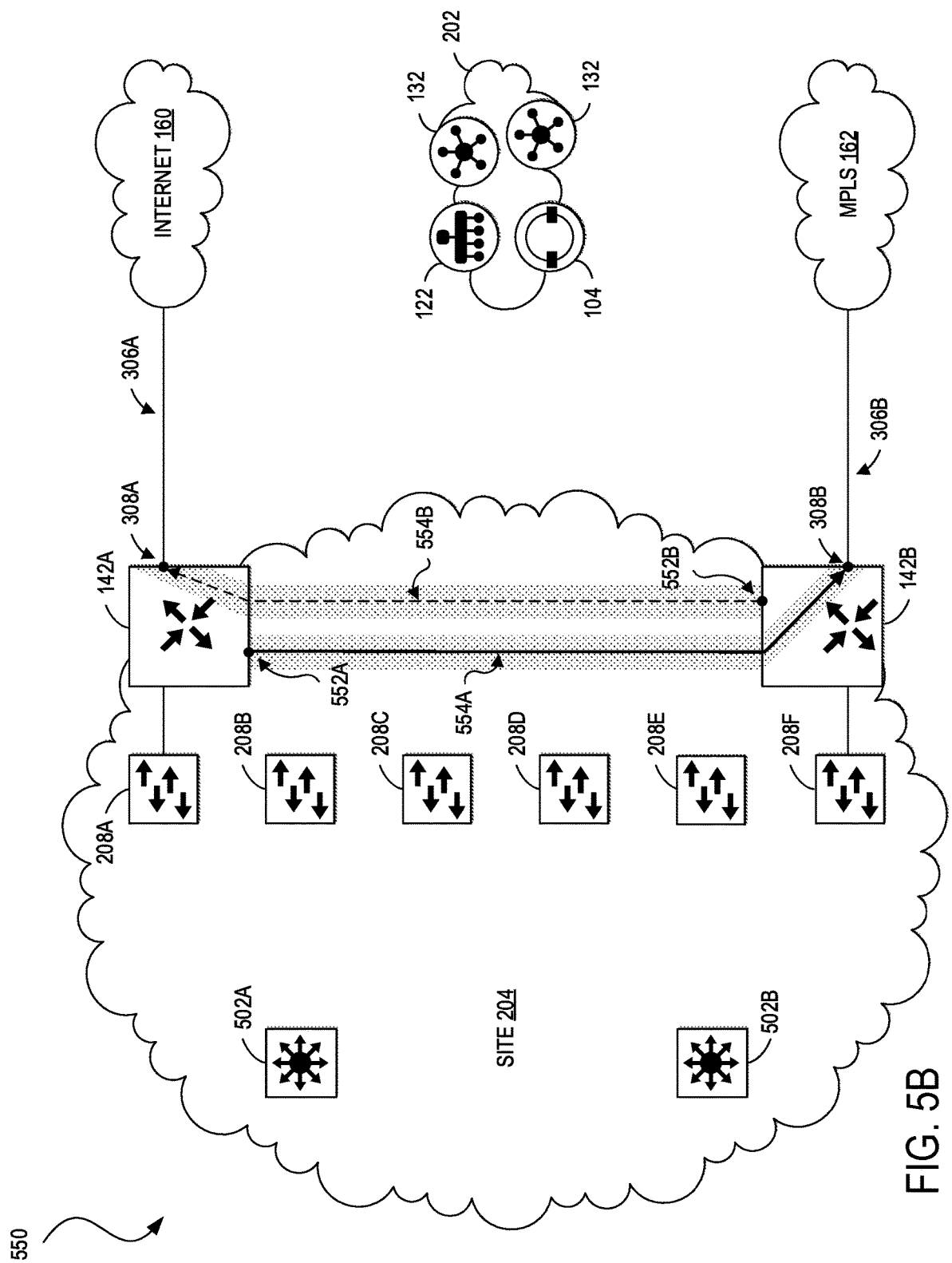

FIG. 5B illustrates a block diagram of an example of a network 550 showing how to connect WAN edge devices, that do not have L2 connectivity, to achieve WAN high availability and extensibility. The network 550 can be similar in many respect to the network 500, and can include the management network 202, the site 204 (e.g., the data center 150, the campus network 152, the branch office 154, etc.), the Internet transport network 160, and the MPLS network 162. The management network 202 can include one or more network orchestrator appliances 104, one or more network management appliances 122, and one or more network controller appliances 132. Each component of the management network 202 can be reached through either transport network 160 or 162.

Similarly, the site 204 can be an access network, a campus network, a LAN, an L2/L3 network, and the like. The site 204 can include the multi-layer network devices 502A and 502B, the access devices 208A-208F, and the WAN edge device 142A and 142B. The multi-layer network devices 502 can process traffic over various network layers and protocols depending on the network topology of the site 204, such as a multi-layer (e.g., core, distribution or aggregation, and access layer), spine-and-leaf, mesh, tree, bus, hub and spoke, and so forth. In some embodiments, the site 204 can include a centralized network controller (not shown) (e.g., Cisco® SD-Access, Cisco ACI™, etc.) for controlling switching, routing, and other network functionality within the site 204. In other embodiments, the network devices may be separately configured and managed. However, one difference between the networks 500 and 550 can be the lack of L2 connectivity between the WAN edge devices 142.

It may not always be possible to provide L2 connectivity between a pair of WAN edge devices within a site. That is, it may not be possible to directly connect the WAN edge devices 142, connect to them a common L2 device, configure L3 interfaces on the edge devices to be in the same subnet, and so forth. Thus, the approach of the network 500 to connect the WAN edge devices 142 by the TLOC-extension interfaces 506 may not achieve the desired network behavior. For example, local routing (e.g., routing within the site 204 controlled by higher-layer network devices (if any), the multi-layer network devices 502, intermediate network devices (if any), the access devices 208, other network devices (if any), or network controllers (if any) between the WAN edge devices 142 (e.g., such as by BGP, OSPF, etc.) cannot ensure that traffic routed through the WAN extension interfaces 508 can reach the TLOC-extension interfaces 506.

In some embodiments, when there is no L2 connectivity between the WAN edge devices 142, high availability and extensibility can be accomplished by establishing a tunnel between a WAN interface on one WAN edge device to a WAN interface on another WAN edge device directly connected to a WAN. For example, to enable the WAN edge device 142A to access the MPLS network 162, an interface of the WAN edge device 142A can be configured as an extended MPLS interface 552A, and a GRE tunnel can be established between the extended MPLS interface 552A on the WAN edge device 142A to the WAN transport interface 308B, on the WAN edge device 142B, directly connected to the MPLS network 162. In this manner, the WAN edge device 142A can have the same local access as the WAN edge device 142B to the WAN interface 308B despite no L2 connectivity between the WAN edge devices. To ensure traffic can be routed back to the WAN edge device 142A, a routing protocol (e.g., BGP, OSPF, etc.) can be run in the transport VPN of the WAN edge device 142B to advertise a subnet of the extended MPLS interface 552A so that, for example, an MPLS provider has a route to the subnet of the extended MPLS interface 552A through the WAN edge device 142B.

To enable the WAN edge device 142B to access the Internet transport network 160, an interface of the WAN edge device 142B can be configured as an extended Internet interface 552B, and a GRE tunnel can be established between the extended Internet interface 552B, and a GRE tunnel can be established between the extended Internet interface 552B on the WAN edge device 142B to the WAN transport interface 308A. In this manner, the WAN edge device 142B can have the same local access as the WAN edge device 142A to the WAN transport interface 308A despite no L2 connectivity to the WAN edge device 142A. If the extended Internet interface 552B is configured with a private IP address, to ensure traffic can be routed back to the WAN edge device 142B, the WAN interface 308A can be configured to perform Network Address Translation of WAN traffic received by the first WAN edge device 142A from the Internet transport network 160 can be routed back to the WAN edge device 142B.

GRE is a protocol used for the encapsulation of a network layer protocol inside another network layer protocol. This form of encapsulation is often referred to as tunneling. GRE can allow devices running a given network layer protocol to communicate over a network running a different network layer protocol. In a network device including support for GRE, the network device can receive a native packet from its logical attachment circuit, encapsulate the native packet into another network protocol, and send the encapsulated packet towards its de-encapsulation point. The encapsulation point is sometimes referred to as a tunnel entry and the de-encapsulation point is sometimes referred to as tunnel exit. Tunnels are typically point-to-point dedicated virtual links to transport packets from one endpoint to another. Although GRE is used in this example to establish the tunnel between pairs of WAN edge devices to enable WAN high availability and extensibility, other types of encapsulation may also be used, such as mGRE, MPLS VPN, Control and Provisioning of Wireless Access Points (CAPWAP), Virtual Extensible Local Area Network (VXLAN), Locator/Identifier Separation Protocol (LISP), and Cisco® Overlay Transport Virtualization (OTV), among others.

In some embodiments, for faster network convergence in the event of a failure of a WAN edge device, it may be possible to re-route traffic between an access device to the failed WAN edge device to an available WAN edge device by establishing one or more tunnels from the interface on the access device connected directly to the failed WAN edge device to the available WAN edge device. For example, if it has been determined that the WAN edge device 142A has failed, then the interface on the access device 208A connected to a service interface (e.g., the service interface 408) of a service VPN (e.g., the service VPN 406) of the WAN edge device 142A may be configured as a tunnel endpoint, and a first tunnel (e.g., GRE or other suitable type of encapsulation) can be established from the access device tunnel endpoint to a service interface of a service VPN of the WAN edge device 142B to reroute traffic originally routed to the service interface of the service VPN of the WAN edge device 142A through the tunnel. A second tunnel can be established from the service interface of the service VPN of the WAN edge device 142B to the access device tunnel point for return traffic. Alternatively or in addition, a first tunnel can be established from the access device tunnel endpoint to the WAN interface 308B for WAN traffic, and a second tunnel can be established from the WAN interface 308B to the access device tunnel endpoint for return traffic.

Figure 6:
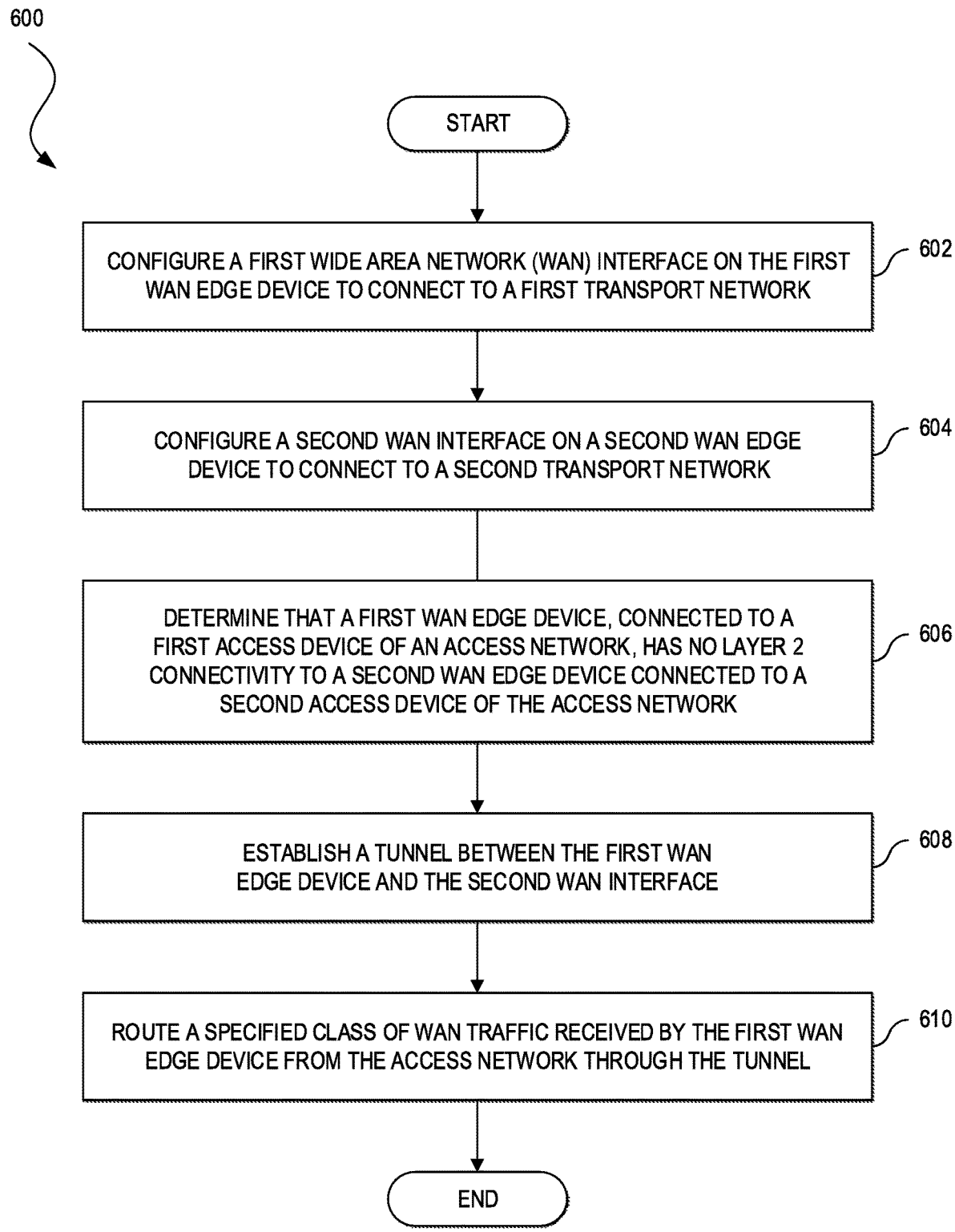
FIG. 6 illustrates an example of a process for connecting WAN edge devices to provide for high availability and extensibility in accordance with an embodiment.

FIG. 6 illustrates an example of a process 600 for connecting WAN edge devices to provide for high availability and extensibility in accordance with an embodiment. One of ordinary skill will understood that, for any processes discussed herein, there can be additional, fewer, or alternative steps performed in similar or alternative orders, or in parallel, within the scope of the various embodiments unless otherwise stated. The process 600 can be performed at least in part by one or more network orchestrators (e.g., Cisco® SD-WAN vBond), network managers (e.g., Cisco® SD-WAN vManage), network controllers (e.g., Cisco® SD-WAN vSmart), and network devices (e.g., Cisco® SD-WAN vEdge routers, multi-layer switches, switches, etc.), among other elements discussed throughout the present disclosure.

The process 600 can begin with a WAN controller (e.g., the network controller appliances 132) configuring a first WAN interface (e.g., the WAN interface 308A) on a first WAN edge device (e.g., the WAN edge device 142) to connect to a first transport network (e.g., an MPLS service provider network, Internet Service Provider (ISP) network, an LTE/4G/5G service provider network, or other WAN service provider network). Then, at step 604, the WAN controller can configure a second WAN interface on a second WAN edge device to connect to a second transport network. For example, the first transport network can be an ISP network (e.g., the Internet transport network 160) and the second transport network can be an MPLS network (e.g., the MPLS network 162). In some embodiments, the WAN controller can configure the WAN interfaces as tunnel endpoints (e.g., IPsec tunnel endpoints) (sometimes also referred to as a TLOCs, Route Locators (RLOCs), Virtual Tunnel Endpoints (VTEPs), transport VPN interfaces, etc.).

The process 600 can proceed to step 606 in which the first WAN edge device, when connected to a first access device (e.g., the access device 208) of an access network (e.g., the data center 150, campus network 152, the branch office 154, or other LAN), has no L2 connectivity to a second WAN edge device, connected to a second access device of the access network. For example, the first WAN edge device can compare its existing subnets to the network address of the second WAN edge device and determine that it has no L2 connectivity to the second WAN edge device.

In other embodiments, the WAN controller can determine the first WAN edge device has no L2 connectivity to the second WAN edge device. For example, the WAN controller and the WAN edge devices can communicate over OMP to determine the topology of the access network at all times or almost all times. Thus, the WAN controller can determine L2 connectivity between WAN edge devices in an access network around the time of on-boarding of the access network, as well as throughout the life of the access network as it changes over time. In some embodiments, the WAN controller can automatically determine L2 connectivity when it detects there are multiple WAN edge devices deployed in an access network to provide an alternative mechanism for high availability and extensibility.

For example, at step 608, a tunnel (e.g., GRE, mGRE, MPLS VPN, CAPWAP, VXLAN, LISP, Cisco® OTV, etc.) can be established between the first WAN edge device and the second WAN interface. In some embodiments, the first WAN edge device can dynamically establish the tunnel when it determines it has direct access to a transport network and another WAN edge device in the same access network does not have local access to the first WAN edge device's transport network. Similarly, the second WAN edge can dynamically establish a second tunnel when it determines it has direct access to a second transport network and another WAN edge device in the same access network does not have local access to the second WAN edge device's transport network.

In other embodiments, the WAN controller can establish the tunnel between the first WAN edge device and the second WAN interface. For example, when the WAN controller determines the first WAN edge device does not have direct access to the second WAN edge device's transport network, the WAN controller can configure an interface of the first WAN edge device as an extended MPLS interface (e.g., the extended MPLS interface 552A), and establish a GRE tunnel between the extended MPLS interface on the first WAN edge device to the WAN interface (e.g., the WAN interface 308B), on the second WAN edge device, directly connected to the MPLS network. This can enable the first WAN edge device to have the same local access as the second WAN edge device has with the directly connected WAN interface despite no L2 connectivity between the WAN edge devices. Thus, reachability can be guaranteed between the first WAN edge device and the MPLS network. To ensure that return traffic can be routed back to the first WAN edge device, a routing protocol (e.g., BGP, OSPF, etc.) can be run in the transport VPN (e.g., the transport VPN 402) of the first WAN edge device to advertise a subnet of the MPLS interface so that, for example, an MPLS provider has a route to the subnet of the MPLS interface through the WAN edge device 142B.

As another example, when the WAN controller determines the second WAN edge device does not have direct access to the first WAN edge device's transport network, the WAN controller can configure an interface on the second WAN edge device as an extended Internet interface (e.g., the Internet interface 552B), and establish a GRE tunnel (e.g., the GRE tunnel 554A) between the extended Internet interface on the second WAN edge device to the WAN interface (e.g., the WAN interface 308A), on the first WAN edge device, directly connected to the Internet transport network. In this manner, the second WAN edge device can have the same local access to the Internet transport network as the first WAN edge device despite no L2 connectivity between the first and second WAN edge devices. If the Internet interface is configured with a private IP address, to ensure traffic can be routed back to the second WAN edge device, the WAN interface (e.g., the WAN interface 308A) on the first WAN edge device can be configured to perform Network Address Translation of WAN traffic received by the first WAN edge device from the Internet transport network such that the return WAN traffic can be routed back to the second WAN edge device.

Various advantages can flow from this approach of connecting WAN edge devices. For example, this approach can enable a pair of WAN edge devices that are each connected to a single transport network to share the transport networks as if they are both directly connected to the transport networks. As a result of the tunnel from the extended WAN interface of the first edge network device, at step 610, the WAN controller can route a specified class of WAN traffic received by the first WAN edge device from the access network through the tunnel. In other words, by implementing this feature, the WAN controller can set policy to control whether a particular class of traffic is routed through the first transport network or the second transport network using various types of control policies or policies controlling routing (e.g., application-aware policies, traffic engineering policies, path affinity policies, service insertion policies, arbitrary VPN topology policies, local control policies controlling OSPF or BGP route maps and prefix lists, etc.) or data policies or policies that influence the flow of data traffic traversing the network based on fields in the IP header and VPN membership (e.g., Zone-Based Firewall policies, application firewall policies, service chaining policies, traffic engineering policies, Quality of Service (QoS) policies, Cflowd flow data collection policies, etc.). This was previously not achievable when each WAN edge device could only access a single transport network.

Another advantage of this approach is providing for high availability of WAN connectivity in the event that one transport network fails. For example, in the event that the WAN controller determines there is no connectivity to the second transport network, the WAN controller can route WAN traffic received by the second WAN edge device from the access network through the second tunnel. In the event that the WAN controller determines there is no connectivity to the first transport network, the WAN controller can route WAN traffic received by the first WAN edge device from the access network through the tunnel.

FIG. 7 illustrates an example of a network device 700 (e.g., switch, router, network appliance, etc.). The network device 700 can include a master central processing unit (CPU) 702, interfaces 704, and a bus 706 (e.g., a Peripheral Component Interconnect (PCI) bus). When acting under the control of appropriate software or firmware, the CPU 702 can be responsible for executing packet management, error detection, and/or routing functions. The CPU 702 preferably accomplishes all these functions under the control of software including an operating system and any appropriate applications software. The CPU 702 may include one or more processors 708 such as a processor from the Motorola family of microprocessors or the Microprocessor without Interlocked Pipelined Stages (MIPS) family of microprocessors. In an alternative embodiment, the processor 708 can be specially designed hardware for controlling the operations of the network device 700. In an embodiment, a memory 710 (such as non-volatile Random Access Memory (RAM) and/or Read-Only Memory (ROM)) can also form part of the CPU 702. However, there are many different ways in which memory could be coupled to the system.

The interfaces 704 can be provided as interface cards (sometimes referred to as line cards). The interfaces 704 can control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 704 may include ports appropriate for communication with the appropriate media. In some cases, the interfaces 704 may also include an independent processor and, in some instances, volatile RAM. The independent processors may control communication intensive tasks such as packet switching, media control, and management. By providing separate processors for the communication intensive tasks, the interfaces 704 may allow the CPU 702 to efficiently perform routing computations, network diagnostics, security functions, and so forth.

Although the system shown in FIG. 7 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 700.

Regardless of the network device's configuration, it may employ one or more memories or memory modules (including the memory 710) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 8A:
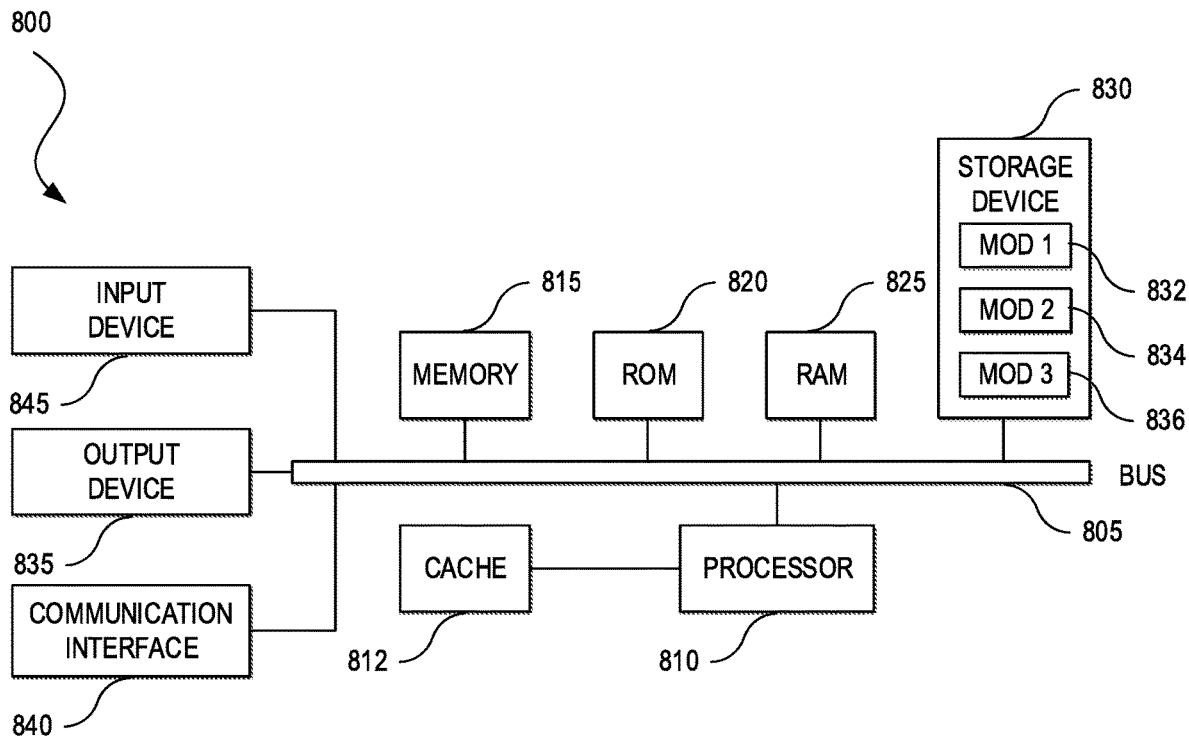
FIGS. 8A and 8B illustrate block diagrams of examples of computing systems in accordance with some embodiments.
Figure 8B:
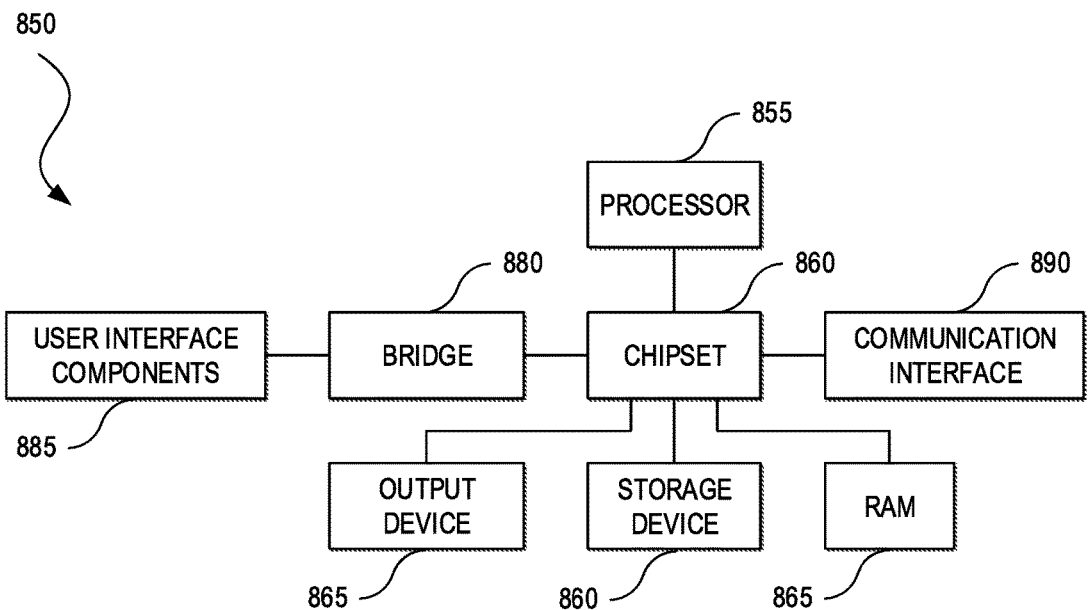

FIG. 8A and FIG. 8B illustrate systems in accordance with various embodiments. The more appropriate system will be apparent to those of ordinary skill in the art when practicing the various embodiments. Persons of ordinary skill in the art will also readily appreciate that other systems are possible.

FIG. 8A illustrates an example of a bus computing system 800 wherein the components of the system are in electrical communication with each other using a bus 805. The computing system 800 can include a processing unit (CPU or processor) 810 and a system bus 805 that may couple various system components including the system memory 815, such as read only memory (ROM) 820 and random access memory (RAM) 825, to the processor 810. The computing system 800 can include a cache 812 of high-speed memory connected directly with, in close proximity to, or integrated as part of the processor 810. The computing system 800 can copy data from the memory 815, ROM 820, RAM 825, and/or storage device 830 to the cache 812 for quick access by the processor 810. In this way, the cache 812 can provide a performance boost that avoids processor delays while waiting for data. These and other modules can control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in the storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing system 800, an input device 845 can represent any number of input mechanisms, such as a microphone for speech, a touch-protected screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing system 800. The communications interface 840 can govern and manage the user input and system output. There may be no restriction on operating on any particular hardware arrangement and therefore the basic features here may easily be substituted for improved hardware or firmware arrangements as they are developed.

The storage device 830 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 830 can include the software modules 832, 834, 836 for controlling the processor 810. Other hardware or software modules are contemplated. The storage device 830 can be connected to the system bus 805. In some embodiments, a hardware module that performs a particular function can include a software component stored in a computer-readable medium in connection with the necessary hardware components, such as the processor 810, bus 805, output device 835, and so forth, to carry out the function.

FIG. 8B illustrates an example architecture for a chipset computing system 850 that can be used in accordance with an embodiment. The computing system 850 can include a processor 855, representative of any number of physically and/or logically distinct resources capable of executing software, firmware, and hardware configured to perform identified computations. The processor 855 can communicate with a chipset 860 that can control input to and output from the processor 855. In this example, the chipset 860 can output information to an output device 865, such as a display, and can read and write information to storage device 870, which can include magnetic media, solid state media, and other suitable storage media. The chipset 860 can also read data from and write data to RAM 875. A bridge 880 for interfacing with a variety of user interface components 885 can be provided for interfacing with the chipset 860. The user interface components 885 can include a keyboard, a microphone, touch detection and processing circuitry, a pointing device, such as a mouse, and so on. Inputs to the computing system 850 can come from any of a variety of sources, machine generated and/or human generated.

The chipset 860 can also interface with one or more communication interfaces 890 that can have different physical interfaces. The communication interfaces 890 can include interfaces for wired and wireless Local Area Networks (LANs), for broadband wireless networks, as well as personal area networks. Some applications of the methods for generating, displaying, and using the technology disclosed herein can include receiving ordered datasets over the physical interface or be generated by the machine itself by the processor 855 analyzing data stored in the storage device 870 or the RAM 875. Further, the computing system 850 can receive inputs from a user via the user interface components 885 and execute appropriate functions, such as browsing functions by interpreting these inputs using the processor 855.

It will be appreciated that computing systems 800 and 850 can have more than one processor 810 and 855, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, Universal Serial (USB) devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
configuring, by a Wide Area Network (WAN) controller, a first WAN interface on a first WAN edge device to connect to a first transport network;
configuring a second WAN interface on a second WAN edge device to connect to a second transport network;
determining, by the WAN controller, that the first WAN edge device, connected to a first access device of an access network, has no Layer 2 connectivity to the second WAN edge device, connected to a second access device of the access network based on determining a topology of the access network;
establishing a tunnel between the first WAN edge device and the second WAN interface, wherein the first WAN edge device has a local access to the second transport network through the tunnel; and
routing a specified class of WAN traffic received by the first WAN edge device from the access network through the tunnel.

2. The computer-implemented method of claim 1, further comprising:
establishing a second tunnel between the second WAN edge device and the first WAN interface; and
routing a second specified class of WAN traffic received by the second WAN edge device from the access network through the second tunnel.

3. The computer-implemented method of claim 2, further comprising:
determining there is no connectivity to the second transport network; and
routing WAN traffic received by the second WAN edge device from the access network through the second tunnel.

4. The computer-implemented method of claim 1, further comprising:
determining there is no connectivity to the first transport network; and
routing WAN traffic received by the first WAN edge device from the access network through the tunnel.

5. The computer-implemented method of claim 1, further comprising:
configuring an extended Multi-Protocol Label Switching (MPLS) interface on the first WAN edge device, wherein the tunnel is established between the extended MPLS interface and the second WAN interface on the second WAN edge device;
advertising a subnet of the extended MPLS interface to the first transport network; and
routing return WAN traffic received by the second WAN edge device from the first transport network to the subnet.

6. The computer-implemented method of claim 5, wherein the subnet is advertised by running a routing protocol in a transport Virtual Private Network (VPN) of the second WAN edge device.

7. The computer-implemented method of claim 1, further comprising:
configuring an extended Internet interface on the first WAN edge device with a private Internet Protocol (IP)

address subnet, wherein the tunnel is established between the extended Internet interface and the second WAN interface on the second WAN edge device;

configuring the second WAN interface to translate a network address of return WAN traffic to the private IP address subnet; and routing the return WAN traffic to the private IP address subnet.

8. The computer-implemented method of claim 1, wherein the tunnel is established using Generic Routing Encapsulation (GRE).

9. The computer-implemented method of claim 1, further comprising:

determining a failure by the first transport network;

configuring an interface of the first access device connected to the first WAN edge device as a tunnel endpoint;

establishing a second tunnel between the interface and the second WAN edge device; and routing traffic received by the first access device to the first WAN edge device through the second tunnel.

10. The computer-implemented method of claim 9, further comprising:

establishing a third tunnel between the second WAN edge device and the interface of the first access device; and routing return traffic received by the second WAN edge device to the first access device through the third tunnel.

11. The computer-implemented method of claim 10, wherein the second tunnel ends and the third tunnel begins at a service interface of a service VPN of the second WAN edge device.

12. The computer-implemented method of claim 10, wherein the second tunnel ends and the third tunnel begins at the second WAN interface of the second WAN edge device.

13. A system, comprising:

one or more processors; and memory including instructions that, when executed by the one or more processors, cause the system to:

configure a first Wide Area Network (WAN) interface on a first WAN edge device to connect to a first transport network;

configure a second WAN interface on a second WAN edge device to connect to a second transport network;

determine that the first WAN edge device, connected to a first access device of an access network, has no Layer 2 (L2) connectivity to the second WAN edge device, connected to a second access device of the access network based on a determination of a topology of the access network;

establish a tunnel between the first WAN edge device and the second WAN interface, wherein the first WAN edge device has a local access to the second transport network through the tunnel; and route a specified class of WAN traffic received by the first WAN edge device from the access network through the tunnel.

14. The system of claim 13, further comprising further instructions that, when executed by the one or more processors, further cause the system to:

establish a second tunnel between the second WAN device and the first WAN interface; and route a second specified class of WAN traffic received by the second WAN edge device from the access network through the second tunnel.

15. The system of claim 14, further comprising further instructions that, when executed by the one or more processors, further cause the system to:

determine there is no connectivity to the second transport network; and route WAN traffic received by the second WAN edge device from the access network through the second tunnel.

16. The system of claim 13, further comprising further instructions that, when executed by the one or more processors, further cause the system to:

determine there is no connectivity to the first transport network; and route WAN traffic received by the first WAN edge device from the access network through the tunnel.

17. A non-transitory computer-readable storage medium including instructions that, when executed by one or more processors of a system, cause the system to:

configure a first Wide Area Network (WAN) interface on a first WAN edge device to connect to a first transport network;

configure a second WAN interface on a second WAN edge device to connect to a second transport network;

determine that the first WAN edge device, connected to a first access device of an access network, has no Layer 2 (L2) connectivity to the second WAN edge device, connected to a second access device of the access network based on a determination of a topology of the access network;

establish a tunnel between the first WAN edge device and the second WAN interface, wherein the first WAN edge device has a local access to the second transport network through the tunnel; and route a specified class of WAN traffic received by the first WAN edge device from the access network through the tunnel.

18. The non-transitory computer-readable storage medium of claim 17, further comprising further instructions that, when executed by the one or more processors, further cause the system to:

configure an extended Multi-Protocol Label Switching (MPLS) interface on the first WAN edge device, wherein the tunnel is established between the extended MPLS interface and the second WAN interface on the second WAN edge device;

advertise a subnet of the extended MPLS interface to the first transport network; and route return WAN traffic received by the second WAN edge device from the first transport network to the subnet.

19. The non-transitory computer-readable storage medium of claim 18, wherein the subnet is advertised by a running a routing protocol in a transport Virtual Private Network of the second WAN edge device.

20. The non-transitory computer-readable storage medium of claim 17, further comprising further instructions that, when executed by the one or more processors, further cause the system to:

configure an extended Internet interface on the first WAN edge device with a private Internet Protocol (IP) address subnet, wherein the tunnel is established between the extended Internet interface and the second WAN interface on the second WAN edge device;

configure the second WAN interface to translate a network address of return WAN traffic to the private IP address subnet; and route the return WAN traffic to the private IP address subnet.

\* \* \* \* \*